United States Patent [19]

Arimura et al.

[11] Patent Number: 4,631,689

[45] Date of Patent: Dec. 23, 1986

[54] MULTI-JOINT ARM ROBOT APPARATUS

[75] Inventors: Yoshiaki Arimura, Yokohama; Masao Obama, Yokosuka; Yutaka Hitomi, Yokohama, all of Japan

[73] Assignee: Tokyo Shibaura Denki Kabushiki Kaisha, Kawasaki, Japan

[21] Appl. No.: 591,492

[22] Filed: Mar. 20, 1984

[30] Foreign Application Priority Data

Mar. 26, 1983 [JP] Japan ................... 58-50711

[51] Int. Cl.⁴ ........................................... G06F 15/46
[52] U.S. Cl. .................................. 364/513; 318/562; 318/568; 364/191; 901/2; 901/15; 901/35; 901/46
[58] Field of Search .................... 364/513, 167-171, 364/191-193; 318/562, 568; 901/2, 9, 11-13, 15, 19, 23, 24, 27-29, 35, 46, 50; 414/730

[56] References Cited

U.S. PATENT DOCUMENTS

| | | | |
|---|---|---|---|
| 3,661,051 | 5/1972 | Dunne et al. | 364/513 |
| 4,160,508 | 7/1979 | Salisbury, Jr. | 414/4 |
| 4,221,997 | 9/1980 | Flemming | 318/574 |
| 4,260,941 | 4/1981 | Engelberger et al. | 318/562 |
| 4,308,584 | 12/1981 | Arai | 364/513 |
| 4,338,672 | 7/1982 | Perzley et al. | 364/513 |
| 4,348,731 | 9/1982 | Kogawa | 364/513 |
| 4,467,436 | 8/1984 | Chance et al. | 364/513 |
| 4,480,495 | 11/1984 | Obama | 74/479 |

FOREIGN PATENT DOCUMENTS

| | | |
|---|---|---|
| 0077609 | 4/1983 | European Pat. Off. . |
| 2433025 | 1/1976 | Fed. Rep. of Germany . |
| 3217966 | 12/1982 | Fed. Rep. of Germany . |
| 2045720 | 11/1980 | United Kingdom . |

Primary Examiner—Joseph Ruggiero
Attorney, Agent, or Firm—Oblon, Fisher, Spivak, McClelland, & Maier

[57] ABSTRACT

A multi-joint arm robot apparatus which includes a multi-joint arm in which a plurality of unit arms are connected in tandem through joints, a driver mechanism arranged in the multi-joint arm to drive each of the joints, a state detecting mechanism arranged in the multi-joint arm to detect the state of each of the joints, and a signal processing mechanism for driving the joint driver mechanism to move the multi-joint arm on a proper path responsive to the state detecting mechanism. For the purpose of reducing the number of signal transmission lines in the multi-joint arm, the signal processing mechanism transmits time-division control signals to the state detecting mechanism in each of the joints through a common control signal line arranged in the multi-joint arm, and the state detecting mechanism transmits state detecting signals to the signal processing mechanism in a time division manner through a data transmission line arranged in the multi-joint arm in response to the time-division control signals.

3 Claims, 4 Drawing Figures

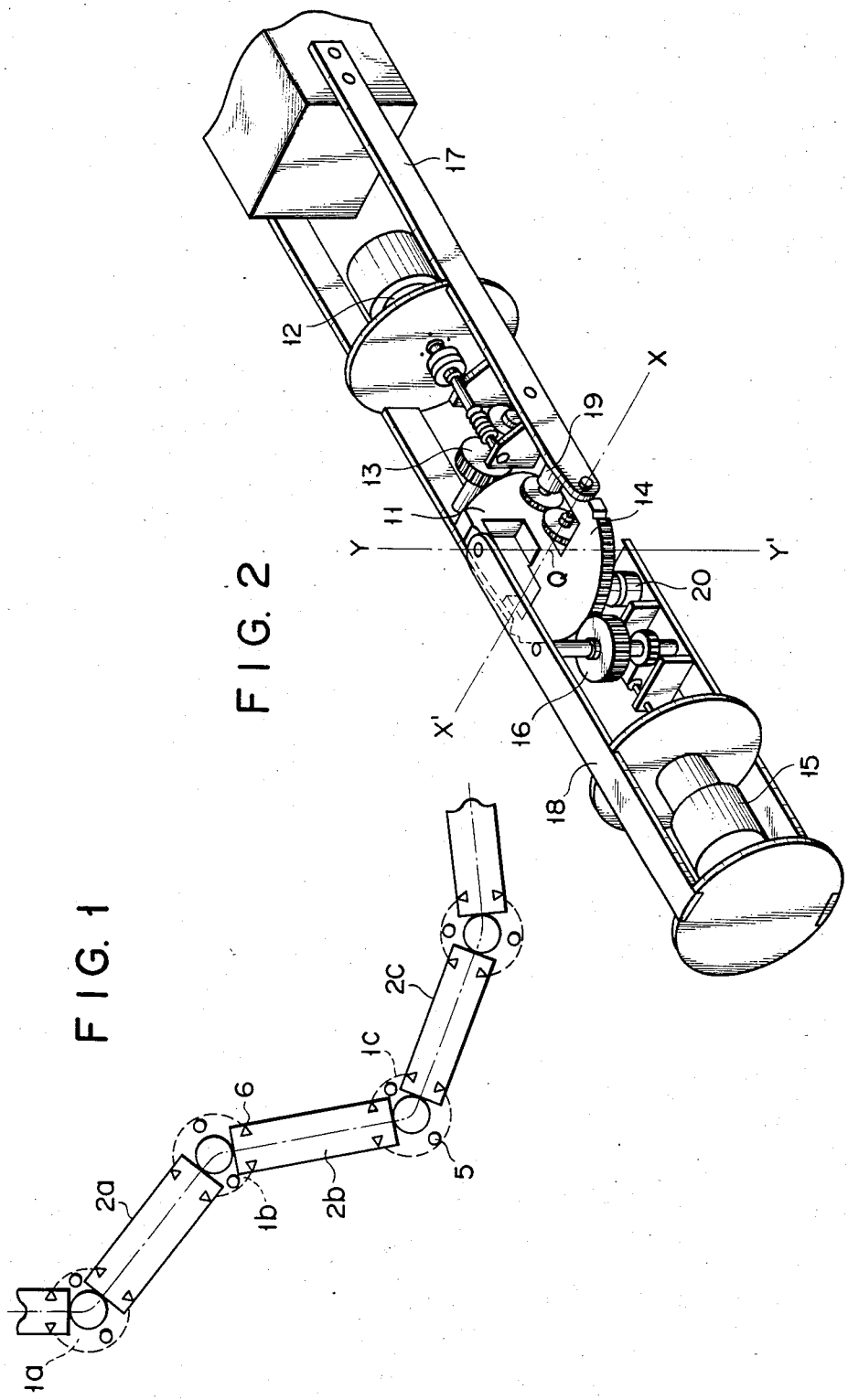

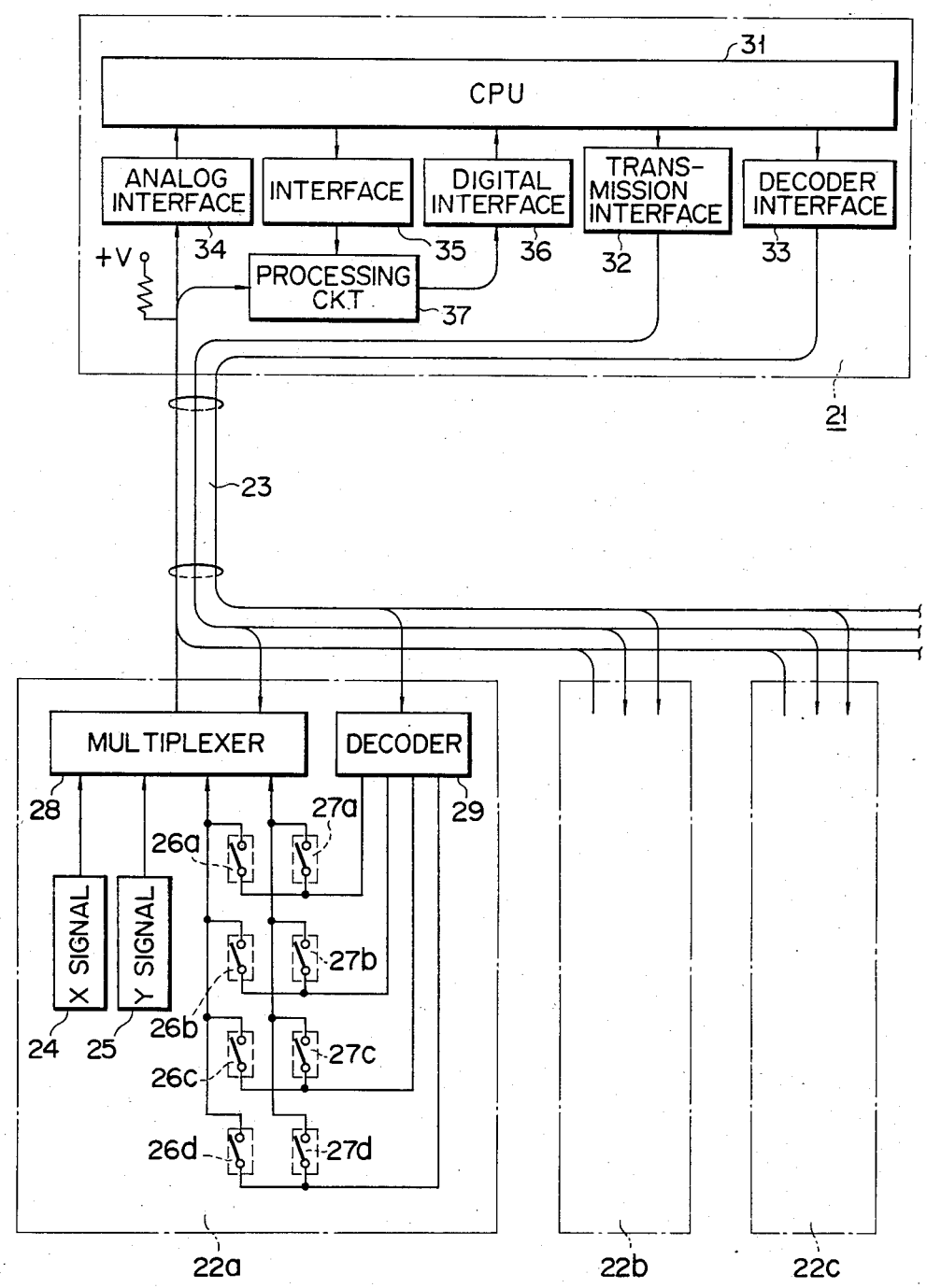

MULTI-JOINT ARM ROBOT APPARATUS

BACKGROUND OF THE INVENTION

1. Field of the Invention

The present invention relates to a multi-joint arm robot apparatus.

2. Discussion of the Background

Since circumstances in facilities such as nuclear reactor, fusion reactor and nuclear fuel reprocessing plants are harmful to human beings, work there is usually done by manipulators. The demand for a manipulator capable of more complicated movement has increased, and multi-joint arm robot apparatuses having a higher degree of freedom in movement have been developed to meet the demand.

Such multi-joint arm robot apparatus is disclosed in U.S. patent application Ser. No. 418,208, filed Sept. 15, 1982, U.S. Pat. No. 4,480,495, and Ser. No. 545,275, filed Oct. 25, 1983, both being assigned to the same assignee as this application. The multi-joint arm robot has, as roughly shown in FIG. 1, a plurality of unit arms 2 (2a, 2b, 2c ...) connected in tandem through joints 1 (1a, 1b, 1c ...). However, the movement of the multi-joint arm robot apparatus becomes extremely complicated, and complicated controls are needed to overcome obstacles in guiding the foremost end of the multi-joint arm to a target.

A rotation angle detector 5, obstacle detector 6, and the like are therefore provided in each of the joints 1 of the multi-joint arm robot, as shown in FIG. 1, and signals detected by these detectors 5 and 6 are applied to a control system to control the multi-joint arm movement.

Since the signals relating to rotation angle, rotation angle limit and obstacle detections are separately transmitted to the control system through signal transmission lines wired in the multi-joint arm, many signal transmission lines must be wired in each of the unit arms 2 so that the number of the signal lines in a unit arm increases as the unit arm is arranged nearer to the base end of the multi-joint arm. Therefore, a space wide enough to wire the signal lines is needed in the multi-joint arm. In addition, these many signal lines are tied in a bundle whose bending resistance increases accordingly, thereby requiring each of the joints to have a large driving force. Such a robot with a high degree of freedom in movement as described above will be large and complicated.

SUMMARY OF THE INVENTION

An object of the present invention is to provide a multi-joint arm robot apparatus in which the number of signal transmission lines necessary to control each of the joints can be decreased.

With the multi-joint arm robot apparatus, in order to properly control the multi-joint arm to move along a path, it is required that motor driving signals be supplied from a control circuit to motors which serve to drive a joint, and that various state detecting signals obtained by joint-state detecting means in each joint be supplied to the control circuit.

According to the present invention, to attain the object the control circuit commonly transmits time division control signals, which select in a time division manner the state detecting means in each of the joints, to the state detecting means in the joints through a common control signal transmitting path arranged in the joint arm, and the state detecting means in each joint transmit state detecting signals in a time division manner to the control circuit through a common data signal transmitting path arranged in the joint arm in response to the time division control signals.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a schematic construction of the multi-joint arm robot apparatus;

FIG. 2 is a perspective view of a joint to which the present invention is applied;

FIG. 3 shows a control system for the multi-joint arm robot apparatus according to an embodiment of the present invention.

DESCRIPTION OF THE PREFERRED EMBODIMENT

Figure 4:
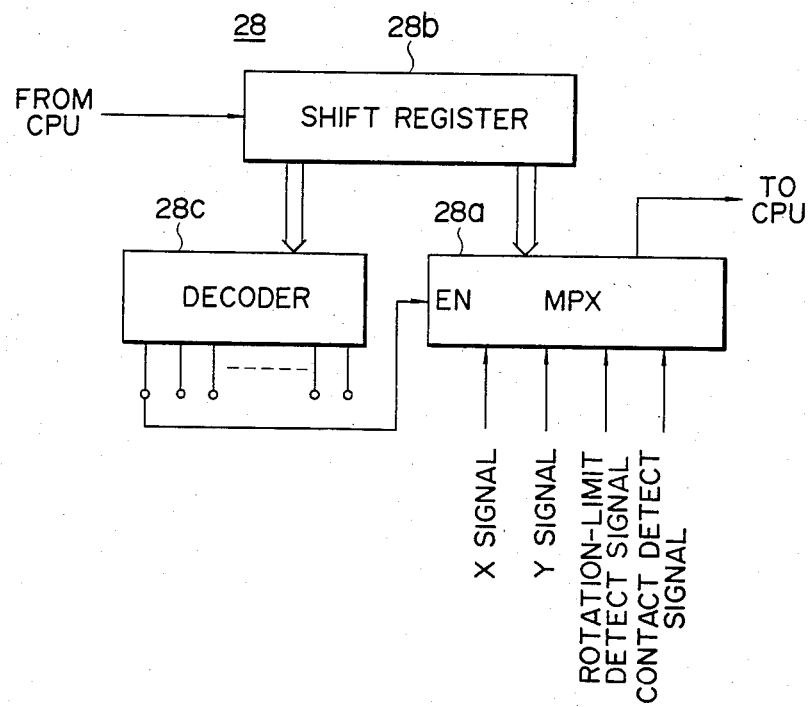
FIG. 4 shows the arrangement of a multiplexer shown in FIG. 3.

The present invention can be applied basically to a multi-joint arm robot wherein a plurality of unit arms 2 are connected in tandem by a plurality of joints 1. As shown in FIG. 2, a first main toothed wheel (guide member) 11, having a rotational axis in the X-X' direction, is engaged with a first driving toothed wheel 13 driven by a motor 12, and a second main toothed wheel (guide member) 14, having a rotational axis in the Y-Y' direction, is engaged with a second driving toothed wheel 16 driven by a motor 15. The first and second main toothed wheels 11 and 14 are rotatably coupled with each other. The first driving toothed wheel 13 and motor 12 are attached integrally to first arm members 17, which can rotate about the X-X' axis. The second driving toothed wheel 16 and motor 15 are attached integrally to second arm members 18, which can rotate about the Y-Y' axis. When the first driving toothed wheel 13 is rotated by the motor 12 the first arm members 17 rotate about the X-X' axis. When the second driving toothed wheel 16 is rotated by the motor 15, the second arm members 18 rotate about the Y-Y' axis. Thus, the second arm members 18 freely move, relative to the first members 17, within a solid angle by controlling the rotations in the directions X-X' and Y-Y'. Reference numerals 19 and 20 represent potentiometers arranged to detect rotation angles of the motors 12 and 15 or of the joints.

Such a multi-joint arm is controlled by a control system with a computer. The control system supplies driving signals to the motors in each of the joints to control the movement of the multi-joint arm while watching output signals of various detectors arranged in each of the joints.

Referring to FIG. 3, a control system according to the present invention will be described. The motor driving system is not shown in the control system. Conventionally, joint-driving motors are separately supplied with driving signals from a motor driving circuit responsive to CPU 31.

Reference numeral 21 represents a processor comprising CPU 31, and numeral 22 (22a, 22b, 22c ...) signal detecting sections each arranged in each of the joints 1. The processor 21 and the signal detecting sections 22 are connected to each other by several signal lines 23, arranged in the joints 1 and the unit arms 2, to achieve time-division transmission and reception of predetermined control signals and various detecting signals.

Each of the signal detecting sections 22 includes a first potentiometer 24 for detecting the movement or rotation angle of a joint in the direction X-X', a second potentiometer 25 for detecting the rotating angle of the joint in the direction Y-Y', four limit switches 26a, 26b, 26c and 26d and four obstacle detectors 27a, 27b, 27c and 27d. The limit switches 26a, 26b, 26c and 26d serve to detect the limits of rotation of the joint in the directions X-X' and Y-Y'. The obstacle detectors 27a, 27b, 27c and 27d are arranged in a unit arm 2, to detect any contact between the unit arm 2 and obstacles in four directions. Proximity switches serve as the obstacle detectors. Responsive to a first control signal from the processor 21, a multiplexer 28 extracts a rotation angle detecting signal (signal X) through the first potentiometer 24, a rotation angle detecting signal (signal Y) through the second potentiometer 25, a rotation limit detecting signal through the limit switch 26a, 26b, 26c or 26d, and an obstacle detecting signal through the obstacle detector 27a, 27b, 27c or 27d in a time division manner, and supplies them to the processor 21. Corresponding ones of the limit switches 26a, 26b, 26c and 26d and the obstacle detectors 27a, 27b, 27c and 27d are sequentially made operative by a decoder 29 which receives a second control signal from the processor 21.

The processor 21 includes CPU 31 and a plurality of interfaces 32 to 36. The transmission of signals between the processor 21 and the signal detecting sections 22a, 22b, 22c... for the joints is attained via the transmission lines 23. The transmission number interface 32 receives the first control signal including a joint selection signal, representing the number of a joint and consisting of plural bits, and a transmission number signal (or multiplexer changeover signal) consisting of a plurality of bits, and commonly supplies them bit-serially to the multiplexer 28 in each of the signal detecting sections 22a, 22b, 22c... through a signal transmitting line. The transmission number signal (or multiplexer changeover signal) denotes which of the rotation angle, rotation limit and obstacle detecting signals should be transmitted to CPU 31. The interface 32 comprises a shift register of parallel input and serial output type. The decoder interface 33 receives a second control signal which denotes a direction discriminating number, representing a direction in which contact and rotation limit information is to be detected, and which consists of a plurality of bits and commonly supplies them bit-serially to a decoder in each of the signal detecting sections 22a, 22b, 22c... The decoder interface 33 is also a shift register of parallel input and serial output type.

The multiplexer 28 may be arranged as shown in FIG. 4. The first control signal from the transmission number setting interface 32 is supplied to a shift register 28b of a serial input and parallel output type. The joint selecting signal from the shift register 28b is supplied to a decoder 28c and the transmission number signal to a multiplexer 28a. The decoder 28c has outputs equal to the number of joints, and when the joint number is decoded, only its corresponding output goes high or low. An enabling terminal of the multiplexer 28a is connected to the corresponding decoder output, and when the corresponding joint number is decoded, the multiplexer 28a is enabled to provide a detection signal which is designated by the transmission number signal.

The detection signal, transmitted from the multiplexer 28 in each of the signal detecting sections 22 through a data line, is picked up by CPU 31 via the analog signal interface 34 or via a processing circuit 37 controlled by the interface 35, and the digital signal interface 36.

The signal detecting sections 22a, 22b, 22c... for the joints operate in a time division manner. Each of the signal detecting sections supplies various detecting signals in a time division manner to the processor within a time slot assigned thereto. The CPU 31 sequentially changes the joint number, designated by the joint selecting signal contained in the first control signal, for the purpose of successively selecting the signal detecting sections 22a, 22b, 22c... in a detecting cycle according to a program. The transmission number signal of the first control signal remains unchanged in one detecting cycle, but changes in every detecting cycle. Namely, four detecting cycles are required to enable CPU 31 to acquire the signal X, signal Y, rotation limit detecting signal and contact detecting signal. The direction discriminating number of the second control signal changes cyclically to successively select the limit switches 26a to 26d or obstacle detectors 27a to 27d in each of the time slots assigned to the signal detecting sections. The detecting signals for four directions are successively acquired by CPU 31 in each of the time slots, assigned to rotation limit detection and contact detection respectively, of each time slot assigned to the signal detecting section.

In operation of the control system shown in FIG. 3, the signal detecting sections 22a, 22b, 22c... are successively enabled by the joint selecting signal of the first control signal in a first detecting cycle. X signal detecting mode is designated by the transmission number signal (0 0) of the first control signal in this detecting cycle. In the first detecting cycle, therefore, signals X are successively transmitted from the signal detecting sections 22a, 22b, 22c... within time slots assigned to the signals X. Since the signals X are detected as analog voltages, they are applied as inputs to the analog signal interface 34 through the data line. The analog signal interface 34 converts the signal X to a digital signal. The transmission number signal becomes 01 in a next detecting cycle to designate the Y signal detecting mode. In the second detecting cycle, therefore, the signals Y are successively transmitted from the signal detecting sections 22a, 22b, 22c... to the analog signal interface 34. The transmission number signal is set to 10 in a third detecting cycle to designate the rotation limit detecting mode. The second control signal changes in the order of 00, 01, 10 and 11 in each of the time slots. The decoder 29 thus causes the limit switches 26a to 26d to be successively connected to ground. Therefore, state detecting signals of the limit switches 26a to 26d are successively transmitted from the multiplexer 28. The state detecting signals of the four limit switches 26a to 26d are supplied in time division manner to the signal processor 21 in each of the time slots which are assigned to the signal detecting sections 22a, 22b, 22c..., respectively. The state detecting signal is a binary or digital signal representing whether the corresponding limit switch is in ON or OFF state. The state detecting signals for limit switches 26a to 26d are converted to a parallel form by the processing circuit 37 and picked up by CPU 31 through the digital signal interface 36. In a fourth detecting cycle, the transmission number signal is set to 11 to designate the obstacle detecting mode. The signal detecting sections 22a, 22b, 22c supply the obstacle detecting signals the obstacle detectors 27a to 27d in a time division manner to the processing circuit 37 within their respective time slots. Similar to the rotation limit detecting signals, the obstacle detecting signals are input to CPU 31 through the digital signal interface 36. As described above, various detecting signals from the signal detecting sections 22a, 22b, 22c... enter CPU 31 in a time division manner through a small number of transmission lines.

It should be understood that the present invention is not limited to the above-described embodiment. The number of signals to be detected by the signal detecting sections 22a, 22b, 22c may be larger or smaller than in the case of the embodiment. Signal transmission can also be achieved by optical communication using optical fiber cables. In this case, the rotation limit detecting signals and obstacle detecting signals may be wavelength multiplexed. Time-division control by the second control signal will then become unnecessary.

Obviously, numerous modifications and variations of the present invention are possible in light of the above teachings. It is therefore to be understood that within the scope of the appended claims, the invention may be practiced otherwise than as specifically described herein.

What is claimed is:

1. A multi-joint arm robot apparatus, comprising:
   a multi-joint arm including a plurality of unit arms connected to tandem through a joint sections;
   means provided in said multi-joint arm for driving each of said joints to move said multi-joint arm;
   state detecting means, provided in each of said joint sections, including rotation angle detecting means for detecting a rotation angle of a corresponding joint section to provide rotation angle signals representative of a joint rotation angle in an analog form, and
   obstacle detecting means for detecting whether a unit arm associated with the corresponding joint section is brought into contact with obstacles to provide obstacle detect signals in a binary form when the unit arm contacts obstacles;
   signal processing means responsive to said state detecting means for driving said joint driving means to move said multi-joint arm on a path; said signal processing means being arranged to transmit common control signals to said state detecting means of said joint sections so that said state detecting means of said joint sections are successively enabled; and said state detecting means of said joint sections each being arranged to transmit, when enabled by said signal processing means, the obstacle detection signals and the rotation angle signals to said signal processing means on a multiplexing basis.

2. The apparatus according to claim 1, further comprising means for transmitting the obstacle detect signals and the rotation angle signals from each of said state detecting means to said signal processing means on a time division multiplexing basis.

3. The apparatus according to claim 1, further comprising means to input the rotation angle signals to said signal processing means through analog-to-digital conversion interface means, and means to input the obstacle detect signals to said signal processing means through digital interface means.

* * * * *